(12) United States Patent
Leelanivas et al.

(10) Patent No.: US 7,468,956 B1
(45) Date of Patent: Dec. 23, 2008

(54) MANAGING ROUTING INFORMATION IN A HUB-AND-SPOKES NETWORK

(75) Inventors: Manoj Leelanivas, Los Gatos, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 954 days.

(21) Appl. No.: 10/374,030

(22) Filed: Feb. 25, 2003

Related U.S. Application Data (60) Provisional application No. 60/404,347, filed on Aug. 16, 2002.

(51) Int. Cl.
*H04L 12/28* (2006.01)
(52) U.S. Cl. .......................... 370/255; 370/392; 370/401
(58) Field of Classification Search ................. 370/255, 370/401, 392
See application file for complete search history.

(56) References Cited

U.S. PATENT DOCUMENTS

2002/0181477 A1* 12/2002 Mo et al. ..................... 370/401
2002/0191541 A1* 12/2002 Buchanan et al. ........... 370/230

OTHER PUBLICATIONS

Rosen et al., "BGP/MPLS VPNs", www.ietf.org/internet-drafts/draft-ietf-ppvpn-rfc2547bis-01.txt, Jan. 2002.

Chuck Semeria, "RFC 2547bis: BGP/MPLS VPN Fundamentals," Juniper Networks, Inc., 2001.
"Configure a Hub-and-Spoke VPN Topology," www.juniper.net/techpubs/software/junos53/swconfig53-vpns/html/vpnl3-examples11..., Juniper Networks, Inc., 2002.
"Enable an IGP on the Hub and Spoke PE Routers," www.juniper.net/techpubs/software/junos53-vpns/html/vpn13-examples12..., Juniper Networks, Inc., 2002.
"Configure LDP on the Hub and Spoke PE Routers," www.juniper.net/techpubs/software/junos53/swconfig53-jpns/html/vpn13-examples13..., Juniper Networks, Inc., 2002.

(Continued)

*Primary Examiner*—Firmin Backer
*Assistant Examiner*—Jason Mattis
(74) *Attorney, Agent, or Firm*—Shumaker & Sieffert, P.A (57) ABSTRACT

A routing device may be connected to multiple spoke site networks, and may receive local routes from these spoke site networks. The routing device may include routing information and forwarding information. The routing device may update the routing information to include the local routes, and selectively generate the forwarding information to exclude the local routes. The routing device may associate labels with the local routes and advertise the labels and local routes to other routing devices. The labels may be associated with interfaces of the routing device or access links that connect the routing device to a spoke site network, and the associations of labels with interfaces or access links may be stored in the forwarding information. The routing device may forward received packets that include the labels according to the labels, and may forward other received packets according to the routes within the forwarding information.

32 Claims, 6 Drawing Sheets

OTHER PUBLICATIONS

"Configure IBGP on the PE Routers," www.juniper.net/techpubs/software/junos53/swconfig53-jpns/html/vpn13-examples14..., Juniper Networks, Inc., 2002.

"Configure Routing Instances for VPNs on the Hub and Spoke PE Routers," www.juniper.net/techpubs/software/junos53/swconfig53-jpns/html/vpnl3-examples15..., Juniper Networks, Inc., 2002.

"Configure VPN Policy on the PE Routers," www.juniper.net/techpubs/software/junos53/swconfig53-jpns/html/vpn13-examples16..., Juniper Networks, Inc., 2002.

"Hub-and-Spoke VPN Configuration Summarized by Router," www.juniper.net/techpubs/software/junos53/swconfig53-jpns/html/vpn13-examples17..., Juniper Networks, Inc., 2002.

* cited by examiner

MANAGING ROUTING INFORMATION IN A HUB-AND-SPOKES NETWORK

This application claims priority from U.S. Provisional Application Ser. No. 60/404,347 filed Aug. 16, 2002, the entire content of which is incorporated herein by reference.

TECHNICAL FIELD

The invention relates to the routing of packets within a network, and more particularly, to the management of routing information by routers within a hub-and-spokes network.

BACKGROUND

A private network may include a number of devices, such as computers, owned or administered by a single enterprise. These devices may be grouped into a number of site networks, which in turn may be geographically distributed over a wide area. Each site network may include one or more local area networks (LANs).

Traditionally, in order to maintain the privacy of the communications between these site networks, interconnection of these site networks has been accomplished using dedicated communication lines leased from a service provider. With the advent of Virtual Private Network (VPN) technology, enterprises can now accomplish private connectivity between site networks over a public network, such as the Internet. By eliminating the need for dedicated lines between the site networks, VPNs yield substantial cost savings as compared to traditional private networks.

A VPN may be configured in a hub-and-spokes topology. In a hub-and-spokes network, one site network is the hub, while other site networks are the spokes. This configuration passes all data through the central hub site network; isolating the spoke site networks, and allowing communication between devices within different spoke site networks only through the hub site network. An enterprise may desire to configure a VPN used by the enterprise in this manner in order to monitor or control communications between devices within different spoke site networks. For example, the hub site network may be the network at the headquarters of the enterprise, while the spoke site networks are typically networks at geographically distributed branch offices, sales offices, manufacturing or distribution facilities, or the like, of the enterprise. The enterprise may desire to configure the VPN in a hub-and-spokes topology to monitor or control communications between these distributed facilities or offices at the headquarters.

Generally, each site network of a VPN connects to the public network via at least one router on the public network administered by a provider of the VPN service. In some situations, multiple site networks of a single VPN may be connected to the public network via the same router. The connection of multiple site networks to the same router may make it difficult to maintain the desired packet flow in a hub-and-spokes VPN. An existing solution to this problem is to configure routers to maintain a separate routing and forwarding information for each site network connected to that router. This existing solution may, however, cause a number of problems. For example, as the number of site networks connected to a single router increases, the demands of maintaining a separate routing and forwarding information for each connected site network on the processing and memory resources of that router will increase proportionally. This increased demand might ultimately affect the performance of that router, decreasing the performance of the VPN as a whole in a way that is apparent to the enterprise.

SUMMARY

In general, the invention is directed to techniques that may be used by routing devices, such as routers, to manage routing information within a hub-and-spokes network. According to the principles of the invention, a router connected to multiple spoke site networks selectively generates forwarding information to exclude "local routes." As used herein, a "local route" refers to a route from a first spoke site network to a second spoke site network that traverses only a single router to which the first and second spoke site networks are commonly connected. Selective generation of forwarding information may allow routers to forward packets such that proper packet flow within a hub-and-spokes network may be achieved without the use of per-site routing and forwarding information and the consumption of router memory and processing recourses associated therewith.

In particular, a spoke router according to the principles of the invention may include a single set of routing information and a single set of forwarding information. A hub router according to the principles of the invention may include two sets of routing information and two sets of forwarding information. A spoke router may receive local routes from connected spoke site networks and routes that traverse a hub site network from a hub router. The spoke router may update routing information to include both hub routes and local routes, but may selectively generate forwarding information to exclude the local routes. The spoke router may forward packets received from connected spoke site networks according to the routes within the forwarding information, i.e., the routes that traverse the hub site network.

The spoke router may use labels associated with access links that connect the spoke router to spoke site networks to forward packets received from the hub router to the spoke site networks. The spoke router may associate the labels with local routes received from connected spoke site networks based on the access link a particular route was received on. The spoke router may advertise the label with the route. The hub router may push the labels onto packets sent to the spoke router. The label/access link associations may be stored as forwarding information.

A hub router, according to the principles of the invention, may maintain two routing instances, a hub routing instance and a spoke routing instance. Each routing instance may be associated with a set of routing information, a set of forwarding information, and an access link. The spoke routing instance may be used to receive routes from connected spoke site networks. The spoke routing instance stores these routes in spoke routing information, and selectively generates spoke forwarding information to exclude these routes. The hub routing instance copies the local routes from spoke routing information to hub routing information, generates hub forwarding information to include these routes, and advertises these routes to the hub site network, which in turn advertises these routes that now traverse the hub site network to the spoke routing instance. The spoke routing instance uses the routes received from the hub site network to forward packets received from connected spoke site networks or spoke routers to the hub site network. The hub site network forwards the packets to the hub routing instance, which may in turn forward the packets to the proper connected spoke site network or spoke router.

In one embodiment, consistent with the principles of the invention, a method comprises receiving routes that include one or more local routes, and selectively generating forwarding information to exclude the local routes.

In another embodiment, a routing device comprises an interface, and a control unit to receive routes that include one or more local routes via the interface, and selectively generate forwarding information to exclude the local routes.

Another embodiment is directed to a computer-readable medium containing instructions. The instructions cause a programmable processor to receive routes that include one or more local routes, and selectively generate forwarding information to exclude the local routes.

Another embodiment is directed to a method comprising receiving routes, determining whether the routes are local routes, associating labels with the local routes, and selectively generating forwarding information to exclude the local routes.

Another embodiment is directed to a routing device including an interface and a control unit to receive routes via the interface, determine whether the routes are local routes, associate labels with the local routes, and selectively generate forwarding information to exclude the local routes.

Another embodiment is directed to a computer-readable medium containing instructions. The instructions cause a programmable processor to receive routes, determine whether the routes are local routes, associate labels with the local routes, and selectively generate forwarding information to exclude the local routes.

Embodiments consistent with the principles of the invention may offer a number of advantages. For example, routers which selectively generate forwarding information to exclude local routes according to the principles of the invention may be prevented from forwarding packets in a manner that is contrary to the proper packet flow for a hub-and-spokes network. Furthermore, routers may associate labels with local routes, and forward packets to connected spoke site networks without the use of local routes. Additionally, routers may maintain all routes for the network in a single set of routing information and a single set of forwarding information in the case of a spoke router and two sets of routing and forwarding information in the case of a hub router, which may conserve the memory and processing resources of such a router, improving the performance of the network from the perspective of an enterprise. Use of routers that require only a limited number of sets of routing information and forwarding information to achieve proper packet flow may reduce the administrative burden associated with adding or removing sites on hub-and-spokes network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
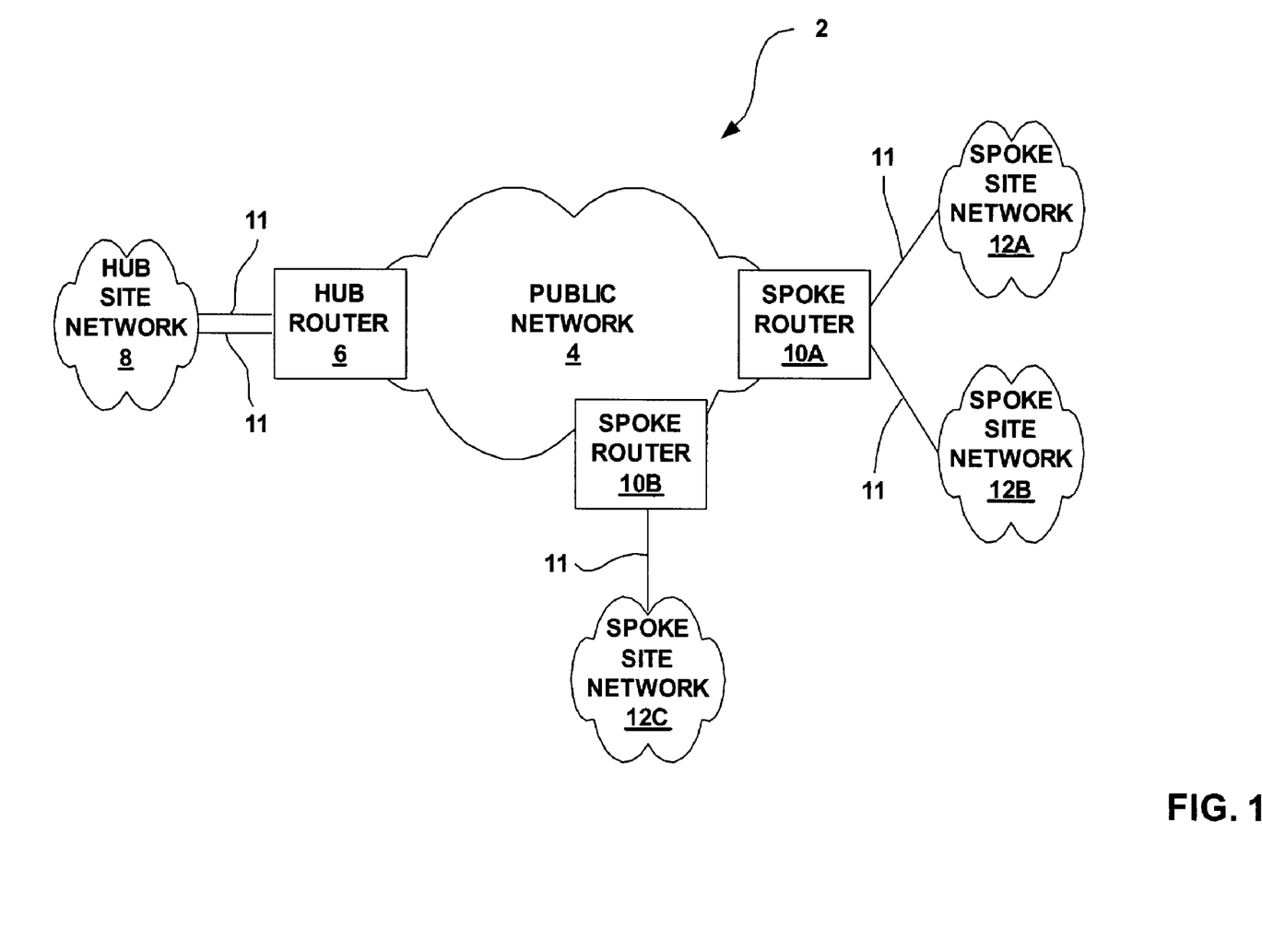
FIG. 1 is a block diagram illustrating an example virtual private network (VPN) configured in a hub-and-spokes topology.

FIG. 1 is a block diagram illustrating an example virtual private network (VPN) 2 configured in a hub-and-spokes topology. VPN 2 includes a hub site network 8 and spoke site networks 12A-12C ("spoke site networks 12") connected to a public network 4. Hub site network 8 and spoke site networks 12 may be the geographically distributed sites of an enterprise. Although VPN 2 may include any number of spoke site networks 12, FIG. 1, for simplicity, shows only spoke site networks 12.

Public network 4 may include one or more autonomous systems (not shown), and may be the Internet. Public network 4 may include a number of devices (not shown), such as routers and switches, used to route packets from point to point across public network 4. The enterprise associated with VPN 2 may utilize public network 4 to route packets between geographically distributed site networks 8 and 12.

Each of hub site network 8 and spoke site networks 12 may include one or more devices (not shown), such as personal computers, laptop computers, handheld computers, workstations, servers, routers, switches, printers, fax machines, or the like. Each of hub site network 8 and spoke site networks 12 may include one or more Local Area Networks (LANs) (not shown).

As shown in FIG. 1, hub site network 8 may be connected to public network 4 via a hub router 6. As shown in FIG. 1, spoke site networks 12 may be connected to public network 4 via spoke routers 10A-B ("spoke routers 10"). Hub site network 8 and spoke site networks 12 may be considered to be edge networks of public network 4. Hub router 6 and spoke routers 10A-B may be considered edge routers within public network 4. Further, hub router 6 and spoke routers 10A-B may be administered by the entity, e.g., the provider, that provides VPN services to the enterprise that includes hub site network 8 and spoke site networks 12. Although the provider may provide more than one VPN utilizing routers 6,10, and many providers may provide VPN services utilizing public network 4, FIG. 1, for simplicity, shows only VPN 2.

As will be discussed in greater detail below, routers 6,10 may selectively generate forwarding information to exclude local routes in order to achieve proper packet flow for hub-and-spokes VPN without the use of individual routing and forwarding information for each access link 11 or interface and the consumption of router and VPN resources associated therewith. As used herein, a "local route" refers to a route from a first network of spoke site networks 12 to a second network of spoke site networks 12 that traverses only a single router 6,10 to which the first and second network of spoke site networks 12 are commonly connected. Routers 6,10 may receive local routes to connected spoke site networks 12 from gateway devices within the connected spoke site networks 12, or a user may configure local routes via programming interfaces provided by routers 6,10. Routers 6,10 will also receive routes to the connected spoke site networks 12 that traverse the hub site network. Routers 6,10 that selectively generate forwarding information will forward packets received from spoke site networks 12 on routes that traverse hub site network 8, i.e., according to the proper packet flow.

Each of hub site network 8 or spoke site networks 12 may, as shown in FIG. 1, connect to public network 4 via a single hub router 6 or one of spoke routers 10, or may be connected to public network 4 via multiple hub routers 6 or spoke routers 10. As shown in FIG. 1, multiple spoke site networks 12A-B may be connected to a single spoke router 10A. Although, as will be discussed below, spoke site networks 12 may also be connected to public network 4 via hub router 6, FIG. 1, for simplicity, shows only spoke site networks 12 connected to public network 4 via spoke routers 10. Further, although any number of spoke site networks 12 may be connected to either a spoke routers 10A-B or hub router 8, FIG. 1, for simplicity, shows only spoke site networks 12A-B connected to public network 4 via spoke router 10A, and spoke site network 12C connected to public network 4 via spoke router 10B.

Hub site network 8 may be connected to hub router 6, and each of spoke site networks 12 may be connected to spoke site routers 10A-B, via one or more access links 11. One or more access links 11 may connect hub router 6 and spoke routers 10 to one or more gateway devices (not shown), such as routers, within hub site network 8 and spoke site networks 12. Access links 11 may be PPP links, ATM links, Ethernet links, Frame Relay link, GRE tunnels, or the like. Furthermore, routers 6, 10A-B may connect to gateway devices and to public network 4 via one or more physical or logical interfaces (not shown) of routers 6,10. Network interface cards of routers 6,10 may provide the physical or logical interfaces. Each access link 11 may correspond to a physical or logical interface of routers 6,10. As shown in FIG. 1, hub router 6 may be connected to a gateway device within hub network 8 by two access links 11, for reasons that will be discussed below.

In general, routers 6,10 are used to facilitate the routing of packets between site networks 8,12 of VPN 2, i.e., packets sent from a first device within one of site networks 8,12 to a second device within another of site networks 8,12. Each of routers 6,10 may include a control unit (not shown) that is responsible for causing router 6,10 to execute the functions ascribed to routers 6,10 herein. The control units may be microprocessors, or the like. The control units of routers 6, 10 may execute application program code stored computer-readable memory, such as RAM, ROM, CD-ROM, magnetic disk or tape, EEPROM, or the like, available locally or via a network connection, that cause the routers 6,10 to execute the functions ascribed to routers 6,10 herein.

Routers 6,10 may exchange routing information with connected gateway devices within connected site networks 8,12 and with others of routers 6,10. Connected gateway devices may advertise routes for destination devices within connected site networks 8,12 to routers 6,10. The routes that routers 6,10 receive from connected gateway devices may be referred to as local routes. Routers 6,10 may also receive local routes configured by a user via programming interfaces provided by the control units. Routers 6,10 may advertise these local routes to others of routers 6,10. Routers 6,10 may advertise routes received from others of routers 6,10 to connected gateway devices, which may in turn communicate those routes of devices within the connected site networks 8,12.

Spoke routers 10 may advertise local routes for destination devices within connected spoke site networks 12 to hub router 6. Hub router 6 may advertise routes for the same destination devices that traverse hub site network 8 to spoke routers 10. Spoke routers 10 may use the routes received from hub router 6 to route packets to the destination devices instead of the local routes received from connected gateway devices in order to assure proper packet flow within hub-and-spokes VPN 2, as will be described in greater detail below.

Routers, 6, 10 may exchange routing information with connected gateway devices using routing protocols such as static routing, Routing Information Protocol (RIP), Open Shortest Path First (OSPF), External Border Gateway Protocol (EBGP), or the like. Routers 6, 10A-B may exchange routing information among themselves using routing protocol such as internal border gateway protocol (IBGP), interior gateway protocol (IGP), or the like.

Devices within different network sites 8,12 may communicate with each other using the Internet Protocol (IP). Each such device may have an IP address that identifies it to other such devices. Consequently, the routing information exchanged by routers 6,10 may include IP addresses.

For example, the local routes received by a router 6,10 from a connected gateway device, or configured by a user, may be local IP routes to devices within the connected site network 8,12. Each local IP route received by the router 6,10 may include the IP address of the destination device, and may indicate that the next hop for received packets with that IP address is the connected gateway device, i.e., that received packets with that IP address should be forwarded to the connected gateway device. When routers 6,10 advertise these local routes to others of routers 6,10, the advertising router 6,10 may advertise the IP address and indicate that the advertising router 6,10 is a next hop for packets with that IP address. When hub router 6 advertises routes for destination devices within spoke site networks 12 that traverse hub site 8 to spoke routers 10, as will be described below, hub router 6 may advertise the IP addresses of the destination devices and indicate that hub router 6 is the next hop for packets with those IP addresses.

Through this exchange of routing information, the devices within site networks 8,12 receive the information necessary to send packets to each other, i.e., the IP addresses of destination devices. Routers 6,10 use the routes received to determine how to forward a received packet, i.e., to which connected gateway device to send a packet received from public network 4, or to which other router 6, to send a packet received from a connected gateway device over public network 4. More specifically, routers 6,10 may use the received routes to determine which logical or physical interface of the router 6,10 to forward the packet on. The cumulative forwarding decisions of the routers 6,10 between the originating device and the destination device determine, in part, the route that a packet will take between the originating device and the destination device. Thus, the manner in which packets are routed within VPN 2 will depend on the manner in which routers 6,10 manage routing information, and make forwarding decisions based on the routing information.

Proper packet flow for a hub-and-spoke VPN, such as hub-and-spokes VPN 2, requires that packets originating from a device within a first spoke site network 12 and destined for a device within a second spoke site network 12 are forwarded by routers 6,10 in such a way that they traverse hub site network 8 before reaching the destination device. The packets must traverse hub site network 8 so that one or more devices within the hub site network 8 can receive and process or analyze the packets before they are delivered to the destination. These devices may monitor or control communications between the various spoke site networks for the enterprise.

For example, when spoke router 10A receives a packet destined for a device within spoke site network 12B or spoke site network 12C from a gateway device within spoke site network 12A via an access link 11, spoke router 10A must forward that packet such that it is routed across public network 4 to hub router 6. Spoke router 10A may not forward the packet directly to a connected gateway device within spoke site network 12B via an access link 11, or to spoke router 10B via public network 4. When hub router 6 receives the packet, it must forward the packet to a gateway device within hub site network 8 via a first access link 11. The gateway device within hub site network 8 may further transmit the packet to one or more devices within hub site network 8 that will process or analyze the packet. After the devices within hub site network 8 have received the packet and processed or analyzed the packet as desired by the enterprise, the gateway device within hub site network 8 may return the packet to hub router 6 via a second access link 11. Hub router may then forward the packet across public network 4 to spoke router 10A or 10B. Spoke router 10A or 10B may forward the packet to a gateway device within spoke site 12B or 12C via access links 11, which may in turn transmit the packet to the destination device. Hub router 6 and spoke routers 10 may, as will be discussed in greater detail below, be configured to manage routing information such that the proper forwarding decisions are made and proper packet flow for hub-and-spokes VPN 2 is achieved.

The packets that routers 6,10 send to and receive from connected gateway devices within site networks 8,12 may be IP packets that contain the IP address of the originating device and the destination. Routers 6,10 may simply forward the IP packets received from connected gateway devices within site networks 8,12 across public network 4. In some embodiments, in order to maintain privacy of communications between site networks 8,12, routers 6,10 may forward the IP packets across public network 4 using secure packet tunnels that terminate at routers 6,10. Exemplary tunneling protocols include Internet Protocol Security (IPSEC), Point-to-Point Tunneling Protocol (PPTP), and Layer Two Tunneling Protocol (L2TP). In addition, routers 6,10 may forward packets across public network 4 using Multiprotocol Label Switching (MPLS).

Routers 6,10 using MPLS may establish one or more Label Switched Paths (LSPs) that connect routers 6,10 to each other. LSPs are unidirectional paths across public network 4 between an originating router 6,10 and a terminating router 6,10. Thus, in hub-and-spokes VPN 2, there may be one or more LSPs established to transmit packets from hub router 6 to each of spoke routers 10, and from each of spoke routers 10 to hub router 6. These LSPs may include a number of routers within public network 4 in addition to the originating and terminating routers 6,10. Routers 6,10 may establish LSPs using Label Distribution Protocol (LDP) or Resource Reservation Protocol (RSVP).

When a terminating router 6,10 using MPLS LSPs to receive packets over public network 4 advertises an IP route for a device within a connected site network 8,12 to the other routers 6,10, the terminating router 6,10 will also advertise a label associated with an LSP with the IP route. When an originating router 6,10 receives a packet with the IP address corresponding to the advertised IP route, the originating router 6,10 may push the label advertised by the terminating router 6,10 onto the IP packet and forward the packet on the LSP associated with that label. The terminating router 6,10 may pop the label off the IP packet, and use the label, instead of the IP address, to forward the packet to a connected gateway device within connected site networks 8,12.

For example, the hub router 6 and spoke router 10A may establish two or more LSPs to transport packets from hub router 6 to spoke router 10A; one LSP associated with each access link 11 interface combinations that connects spoke router 10A to gateway devices of each connected spoke site 12A-B. Each LSP may have an associated label. When receiving routes from connected gateway devices via an access link 11, spoke router 10A may associate the routes with the labels associated with the access link 11 or interface over which a particular route is received. When advertising the routes to hub router 6, spoke router 10A may advertise the labels associated with the access links 11 or interface with the route. Hub router 6 may use the IP address of a received packet destined for either spoke site 12A or 12B to determine which label to push onto the packet, and which LSP to forward the packet on. Spoke router 10A will use the label on the incoming packet from hub router 6 to determine which access link 11 or interface to forward the packet on.

Whether or not MPLS is used to forward packets across public network 4, routers 6,10 may use labels associated with access links 11 to allow forwarding of packets to destination devices within the connected site networks 8,12 without using the IP addresses of the packets. In other words, routers 6, 10 may associate labels with access links 11 or interfaces, associate the labels with routes received via those access links 11 or interfaces, advertise the labels with the routes, push the labels onto packets sent via public network 4, and use the labels on packets received from public network 4 to determine which access link 11 or interface to forward the packet on, without actually using LSPs to forward the packets across public network 4. Routers within public network 4 may route packets containing the label using IP routing or a tunneling protocol, and ignore the label. Routers 6,10 receiving packets via public network 4 via IP routing or a tunneling protocol may look for the label and use the label to forward packets to connected site networks 8,12.

As mentioned above, routers 6,10 may selectively generate forwarding information to exclude local routes in order to achieve proper packet flow for hub-and-spokes VPN 2. Routers 6,10 that selectively generate forwarding information will forward packets received from spoke site networks 12 on routes that traverse hub site network 8, i.e., according to the proper packet flow. Spoke routers 10 may use labels to forward packets that have traversed hub site network 8 to destinations within connected spoke site networks 12.

Figure 2:
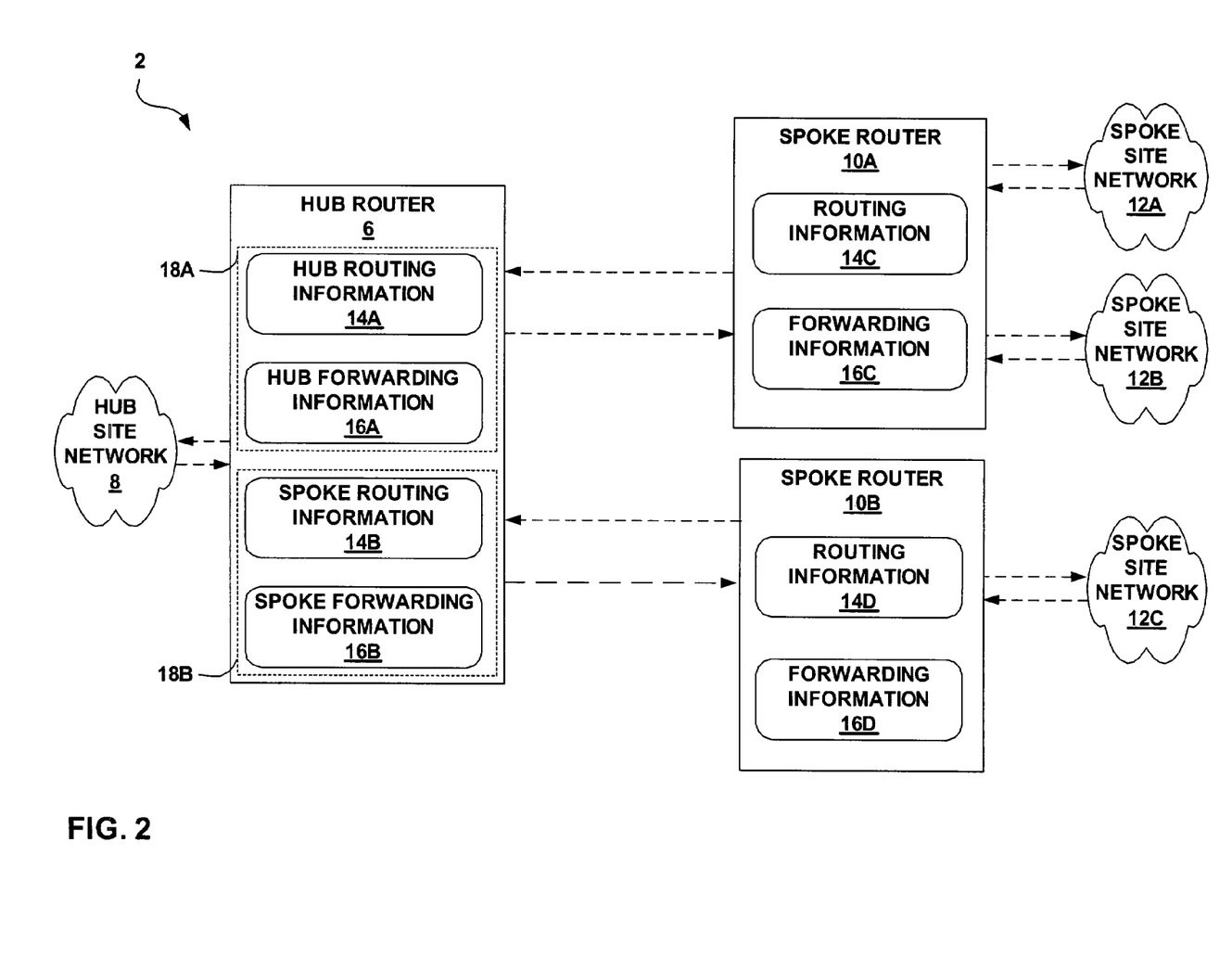
FIG. 2 is a block diagram illustrating an example flow of routing information within the VPN of FIG. 1 consistent with the principles of the invention.

FIG. 2 is a block diagram illustrating an example flow of routing information within VPN 2. As shown in FIG. 2, routing information generally flows from spoke site networks 12 to spoke routers 10, from spoke routers 10 to hub router 6, from hub router 6 to hub site network 8. In addition, routing information flows in return from hub site network 8 to hub router 6, from hub router 6 to spoke routers 10, and from spoke routers 10 to spoke site networks 12. Proper packet flow within hub-and-spokes VPN 2 is generally the reverse of this routing information flow. Configuring routers 6,10 to selectively generate forwarding information to exclude local routes may cause routers 6,10 to forward packets such that proper packet flow for hub-and-spokes VPN 2 is achieved, i.e., such that packets originating from a device within a first spoke site network 12 and destined for a device within a second spoke site network 12 traverse hub site network 8.

As shown in FIG. 2, hub router 6 includes hub routing information 14A and spoke routing information 14B. Hub router 6 also includes hub forwarding information 16A and spoke forwarding information 16B. Spoke router 10A includes routing information 14C and forwarding information 16C. Spoke router 10B includes routing information 14D and forwarding information 16D. Routers 6,10 may store routing information 14 and forwarding information 16 in one or more of a variety of data structures, such as a number of tables, link lists, radix trees, databases, flat files, or other data structures. Hub router 6 includes two sets of routing information 14A-B and two sets of forwarding information 16A-B for reasons that will be discussed below.

Generally, routers 6,10 store all routes received from connected gateway devices, from a user, or from each other within routing information 14. When a router 6,10 receives a new route, the router 6,10 updates the routing information 14 to include that route. Routing information 14A will generally, as will be described below, include routes to destination devices within spoke site networks 12 advertised to hub router 6 by spoke routers 10. Routing information 14B will generally, as will be described below, include routes to destination devices within hub site network 8, and routes to destination devices within spoke site networks 12 that traverse hub site network 8. Routing information 14C-D will generally, as will be described in greater detail below, include local routes for destination devices within spoke site networks 12 received by spoke routers 10 from connected gateway devices within spoke site networks 12, and routes to the same destination devices within connected spoke site networks 12 and routes to destination devices within other spoke site networks 12 that traverse hub site network 8.

Forwarding information 16 is used by routers 6,10 to forward received packets, i.e., to determine over which access link 11 or interface to forward a received packet. Routers 6,10 may generate forwarding information 16 based upon the routes stored within routing information 14. The routing protocols employed by routers 6,10 may prefer the shortest or most efficient route to a destination. Thus, the routing protocols employed by spoke router 10A may generally prefer to use local routes to generate forwarding information 16C. However, if spoke router 10A used local routes to forward packets to destination devices within connected spoke site networks 12A-B, spoke router 10A would, for example, forward packets received from a device within spoke site network 12A to a device within spoke site network 12B directly without forwarding the packets to hub router 6.

Thus, if a spoke router with multiple connected spoke site networks such as spoke router 10A with connected spoke site networks 12A-B, uses local routes to forward data to the connected spoke site networks, proper packet flow for a hub-and-spokes VPN will not be achieved. As will be discussed in greater detail below, spoke routers 10 may selectively generate forwarding information 16C-D to exclude local routes. Spoke routers 10 may instead use labels to forward packets to destinations within connected spoke site networks 12 in order to facilitate proper packet flow within hub-and-spokes VPN 2.

As mentioned above, routers 6,10 manage routing information such that proper packet flow for hub-and-spokes VPN 2 is achieved. As described above, proper packet flow within hub-and-spokes VPN 2 requires that all packets traverse hub site 8. In particular, proper packet flow requires that spoke routers 10 are not able to send packets directly to each other via public network 4, that hub router 6 is not able to send packets to spoke router 10 without first sending the packets to hub site 8, and that spoke router 10A is not able to send packets from one of spoke site networks 12A-B to another of spoke site networks 12A-B.

One aspect of the management of routing information by routers 6,10 to achieve proper packet flow within VPN 2 is the use of border gateway protocol (BGP) community tags by routers 6,10 when exchanging routing information with each other. BGP community tags are included in the IBGP messages used to advertise routes as attributes of the routes. BGP community tags may be used to prevent spoke routers 10 from receiving routes advertised by each other, which will prevent spoke routers 10 from sending packets directly to each other.

Spoke routers 10 may be configured to have an import target "hub" and an export target "spoke." Conversely, hub router 6 may be configured to have an import target "spoke" and an export target "hub." The export targets for hub router 6 and spoke routers 10 indicate which tag is included by routers 6,10 when advertising routes. Thus, when hub router 6 advertises routes, it includes the "hub" tag with the routes, and when spoke routers 10 advertise routes, they include the "spoke" tag with the routes. The import targets indicate which routes routers 6,10 will include in their routing information 14A, C-D based on the tag included with the routes. Thus, hub router 6 will only include routes from spoke sites 10 advertised with the "spoke" tag in routing information 14A, and spoke routers 10 will only include routes from hub site 6 advertised with the "hub" tag in routing information 14C-D.

If, for example, spoke router 10A advertises a route to a destination within spoke site network 12A or 12B and includes the "spoke" tag with the route, spoke router 10B will not include the route in routing information 14D, and will instead discard the route. Thus, if spoke router 10B receives a packet from spoke site network 12C destined for a device within spoke site network 12A or 12B, spoke router 10B will not have a direct route to spoke router 10A available to it in routing information 14D, and will be prevented from forwarding the packet directly to spoke router 10A via public network 4.

Instead, spoke router 10B may have received a route to the destination within spoke site network 12A or 12B from hub router 6 that included the "hub" tag, and included that route within routing information 14D. The route received from hub router 6 will be a route that traverses hub site 8 before reaching the destination device, i.e., a route for which hub router 6 is listed as a next hop on the path to the destination device. Spoke site 10B may use that route to forward the packets to hub router 6, which may forward the packet to a connected gateway device within hub site network 8 via a first access link 11, receive the packet back from hub site network via a second access link 11, and forward the packet to spoke router 10A—achieving the proper packet flow in hub-and-spokes VPN 2. Similarly, the use of BGP community tags will prevent spoke router 10A from sending packets directly to spoke router 10B, as the only routes to destinations within spoke site network 12C included within routing information 14C will be routes for which hub router 6 is listed as a next hop.

Another aspect of the management of routing information, in this case by hub router 6, to achieve proper packet flow within VPN 2 is the is the configuration of hub router 6 to include two routing instances, 18A and 18B ("routing instances 18") for VPN 2, wherein each of routing instances 18 is associated with an access link 11 between hub router and gateway device within hub site network 8. The two routing instances 18 of hub router 6 may be referred to as "hub" routing instance 18A and "spoke" routing instance 18B. Hub instance 18A is associated with hub routing information 14A, hub forwarding information 16A, and a first access link 11 connecting hub router 6 to a gateway device within hub site 8. Spoke instance 18B is associated with spoke routing information 14B, spoke forwarding information 16B, and a second access link 11 connecting hub router 6 to a gateway device within hub site 8. The configuration of hub router 6 in this manner may prevent hub router 6 from forwarding packets to spoke routers 10 without first forwarding the packets to the connected gateway device within hub site network 8.

Hub routing instance 18A is configured to receive all routes to destination devices within spoke site networks 12 advertised to hub router 6 by spoke routers 10, and store those routes within hub routing information 14A. Spoke routers 10 may advertise the routes with the spoke tag, and hub routing instance 18A may be configured with an import target of spoke, as described above. The advertised routes will indicate that the advertising spoke router 10 is the next hop for the route.

Hub routing instance 18A may further be configured to advertise the received routes to the connected gateway device within hub site network 8 via the first access link 11. Hub routing instance 18A will advertise the routes with an indication that hub routing instance 18A via the first access link 11 is the next hop for the route. The connected gateway device within hub site network may then advertise the received routes to spoke routing instance 18B of hub router 6 via the second access link 11. The connected gateway device within hub site network 8 will advertise the routes with an indication that the connected gateway device is the next hop for the routes. The connected gateway device within hub site network 8 may be configured to receive only routes advertised by hub routing instance 18A via first access link 11, and to advertise routes only to spoke routing instance 18B via the second access link 11.

Spoke routing instance 18B of hub router 6 is configured to update spoke routing information 14B to include the routes received from the connected gateway device of hub site network 8, and advertise all routes received from the connected gateway device of hub site network 8 to spoke routers 10. Thus, spoke routing instance 18B may be configured with an export target of spoke, as described above, and spoke routers 10 will update routing information 14C-D to include the routes received from spoke routing instance with the spoke tag. Spoke routing instance 18B will advertise the routes with an indication that spoke routing instance 18B is the next hop for the routes.

As mentioned above, routing protocols may generally prefer to generate forwarding information 16 using the shortest or most efficient routes within routing information 14. If hub router 6, like spoke routers 10, was configured with a single routing instance for VPN 2 that included a single set of routing information and a single set of forwarding information, the single set of routing information would include both the routes to destination devices within spoke site networks 12 that traversed hub site network 8 and the direct routes to the same destination devices received from the advertising spoke routers 10. Hub router 6 would select the direct route to include in its single forwarding information, and would forward packets to those destinations directly to spoke routers 10 such that the packets would not traverse hub site network 8. By contrast, when hub router 6, which maintains separate routing instances as described above, receives packets via spoke routing instance from spoke routers 10, the only routes available within routing information 14B are routes for which the connected gateway device within spoke site network 8 is the next hop.

Packets forwarded by spoke routers 10 according to routes received from the spoke routing instance 18B of spoke router 6 will follow the series of next hops to spoke routing instance 18B of hub router 6, hub site network 8, hub routing instance 18A of hub router 6, and the destination spoke router 10A-B. This is the desired packet flow for hub-and-spokes VPN 2.

Another aspect of the management of routing information in order to achieve the proper packet flow within VPN 2 is the selective generation of forwarding information 16A,C-D by routers 6,10, and the use of labels by routers 6,10 to enable forwarding of packets to connected site networks 8,12 without the use of local IP routes. The selective generation of forwarding information 16A,C-D and use of labels are necessitated where a single hub router 6 or spoke router 10 is connected to multiple spoke site networks 12. In VPN 2, spoke router 10A is connected to spoke site networks 12A-B.

As described above, routing information 14C will include local routes to destination devices within spoke site networks 12A-B received from connected gateway devices within spoke site networks 12A-B or a user, and routes to the destinations within spoke site networks 12A-B that traverse hub site 8 received from hub router 6. Selective generation of forwarding information 16C is necessary because the routing protocols employed by spoke router 10A would generally prefer to use the local routes to generate forwarding information 16C. If spoke router 10A used local routes to forward packets to destination devices within connected spoke site networks 12A-B, spoke router 10A would, for example, forward packets received from a device within spoke site network 12A to a device within spoke site network 12B directly without forwarding the packets to hub router 6, leading to improper packet flow for a hub-and-spokes VPN 2.

When spoke router 10A receives a route, spoke router 10A will determine whether that route is a local route. Where a route is received via an access link 11, spoke router 10A may determine whether the route is a local route by, for example, identifying the access link 11, interface, or routing protocol the route was received by. A user configuring a route for spoke router 10A may identify the route as a local route.

Spoke router 10A may store the local route in routing information 14C, but will selectively generate forwarding information 16C to exclude the local route. Local routes may be tagged or otherwise identified as local within routing information 14A such that they are not included when forwarding information 16A is generated. The local route will be advertised to hub router 6, and spoke router 10A will receive a route to the destination of the local route that traverses hub site network 8 from hub router 6, as described above. Spoke router 10A may selectively generate forwarding information 16C to include the hub routes, which may not be tagged or otherwise identified as local routes. Thus, for example, when spoke router 10A receives a packet from a device within spoke site network 12A destined for a destination device within spoke site network 12B, the only forwarding option available to spoke router 10A will be the route that traverses hub site network 8. This will prevent spoke router 10A from forwarding the packet directly to spoke site network 12B, and lead to proper packet flow for hub-and-spokes VPN 2.

However, if spoke router 10A does not include local routes to destination devices within spoke site networks 12A-B within forwarding information 16C, spoke router 10A will need another method to determine which access link 11 to forward packets destined for destination devices within hub site networks 12A-B received from hub router 6 via public network 4 on. Spoke router 10A may, as described above, assign a label to each access link 11, and associate the label for an access link 11 with all routes received via that access link 11. Spoke router 10A may store the associations of labels with access links 11 in forwarding information 16C. Spoke router 10A may dynamically associate labels with access links 11, or a user may configure the associations of labels with access links. Further, spoke router 10A may advertise the label associated with a route with the route to hub router 6. When hub router 6 receives a packet destined from a destination device within spoke site networks 12A-B, hub router 6 may push the label onto the packet and forward the packet across public network 4 to spoke router 10A. When spoke router 10A receives the packet, spoke router 10A may pop the label off the packet, look the label up in forwarding information 16C to determine the associated access link 11, and forward the packet on that access link 11. Thus, spoke router 10A using labels, is able to forward packets to the correct gateway device within spoke site networks 12A-B without using the local routes received from the gateway devices.

Although selective generation of forwarding information 16 may only be necessary in VPN 2 for spoke router 10A that is connected to multiple spoke site networks 12A-B, it may be desirable to configure all spoke routers 10 of a VPN to selectively generate forwarding information 16 for consistency of configuration and scalability of the VPN. Further, for consistency and scalability, it may be desirable to configure all routers 6,10 to assign labels to access links 11, and use the labels to forward packets on those access links 11. Spoke routing instance of hub router 6, for example may advertise a label with all routes advertised to spoke routers 10. The routes may have been received from a connected gateway device within hub site network via the second access link 11, and the label may be associated with access link 11. In addition to spoke routers 10 selectively generating forwarding information 16, when hub router 6 is connected to spoke site networks 12, hub router 6 may also be configured to selectively generate forwarding information 16B, as will be described below.

Figure 3:
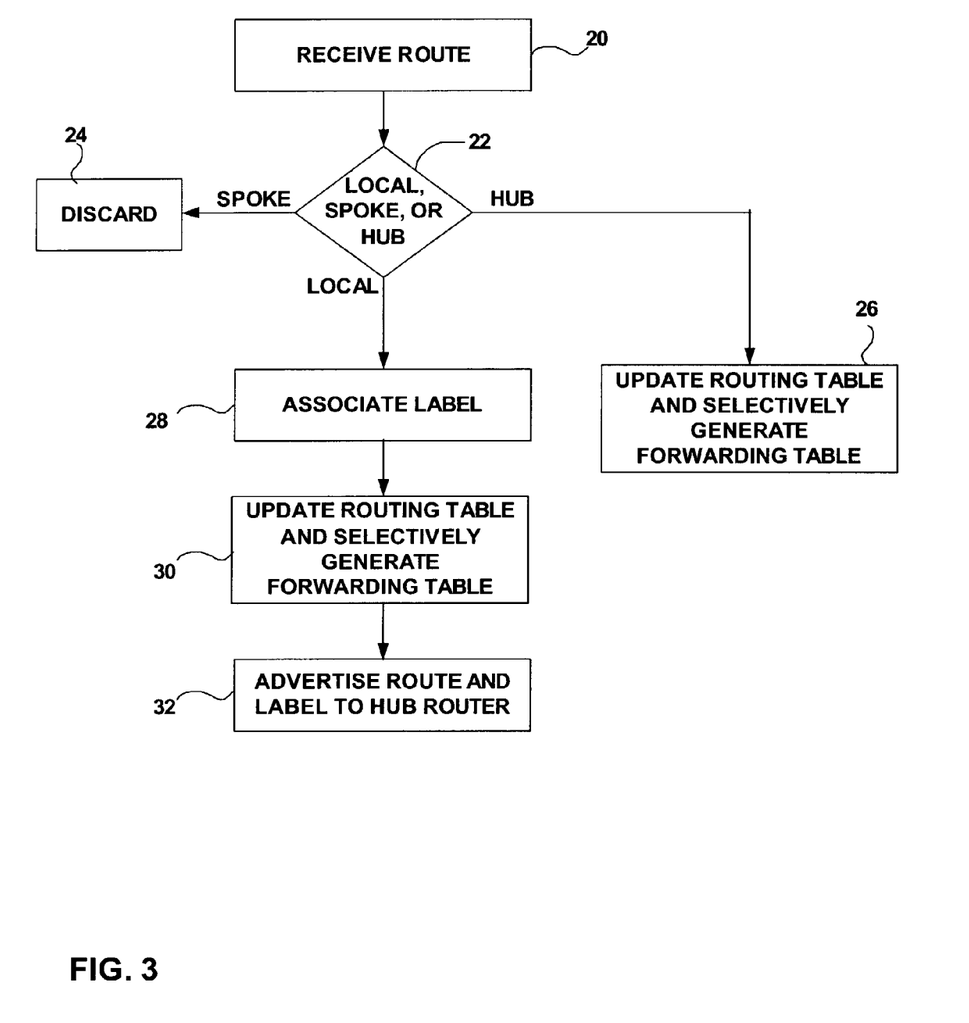
FIG. 3 is a flow diagram illustrating an example method that may be employed by a spoke router to manage routing information.

FIG. 3 is a flow diagram illustrating an example method that may be employed by spoke routers 10 to manage routing information. When spoke routers 10 receive a route (20), spoke routers 10 may determine whether the route is a local route, a spoke route received from the other of spoke routers 10, or a hub route received from hub router 6 (22). This determination may, as described above, be made based on the presence of a hub or spoke BGP community tag in the case of hub routes and spoke routes, or based on user identification or the access link 11, interface, or routing protocol by which the route is received in the case of local routes. If the route is a spoke route, spoke routers 10 may discard the route (24). If the route is a hub route, spoke routers 10 may update routing information 14C-D to include the route and selectively generate forwarding information 16C-D to include the route (26). If the route is a local route, spoke routers 10 may associate a label with route (28), update routing information 14C-D to include the route, and selectively generate forwarding information 16C-D to exclude the local route (30), as described above. Spoke routers 10 may tag or otherwise identify local routes within routing information 14C-D, and selectively generate forwarding information 16C-D to exclude tagged routes. Spoke routers 10 may also advertise the route and the associated label with the spoke tag, thus advertising the route and associated label to hub router 6 (32), as describe above.

Figure 4:
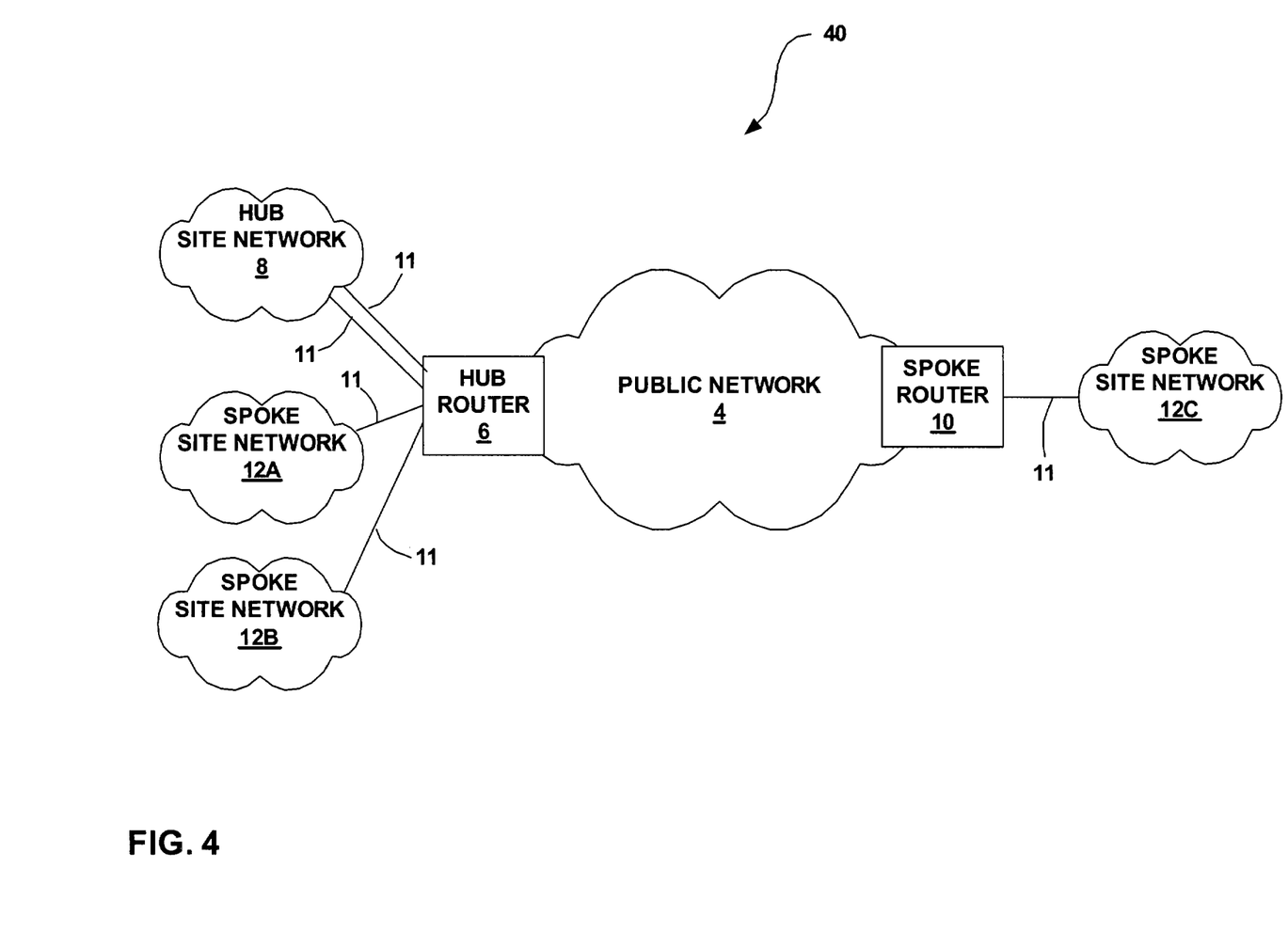
FIG. 4 is a block diagram illustrating another example VPN configured in a hub-and-spokes topology.

FIG. 4 is a block diagram illustrating another example VPN 40 configured in a hub-and-spokes topology. Like hub-and-spokes VPN 2 of FIG. 1, hub-and-spokes VPN 40 includes hub site network 8 and spoke site networks 12 connected to public network 4. However, VPN 40 includes spoke site networks 12A-B connected to public network 4 via hub router 6 and spoke site network 12C connected to public network 4 via spoke router 10. Although VPN 40, like VPN 2, may include a number of spoke routers 10 with multiple attached spoke site networks 12, for simplicity, VPN 40 is shown in FIG. 4 as including only a single spoke router 10 with the single attached spoke site network 12C.

Like VPN 2 of FIG. 1, proper packet flow for hub-and-spokes VPN 40, requires that packets sent by a device within one of spoke site networks 12 and destined for a device within another of spoke site networks 12 traverse hub site network 8. Routers 6,10 may manage routing information as described above to achieve proper packet flow within hub-and-spokes VPN 40. In particular, routers 6,10 may selectively generate forwarding information to exclude local routes in order to achieve proper packet flow for hub-and-spokes VPN without the use of individual routing and forwarding information for each access link 11 or interface and the consumption of router and VPN resources associated therewith. Routers 6,10 that selectively generate forwarding information will forward packets received from spoke site networks 12 on routes that traverse hub site network 8, i.e., according to the proper packet flow. Additional obstacles to proper packet flow within hub-and-spokes VPN 40 may be presented by the connection of spoke site networks 12A-B to hub router 6. Hub router 6 may be configured to manage route information in order to overcome those obstacles.

Figure 5:
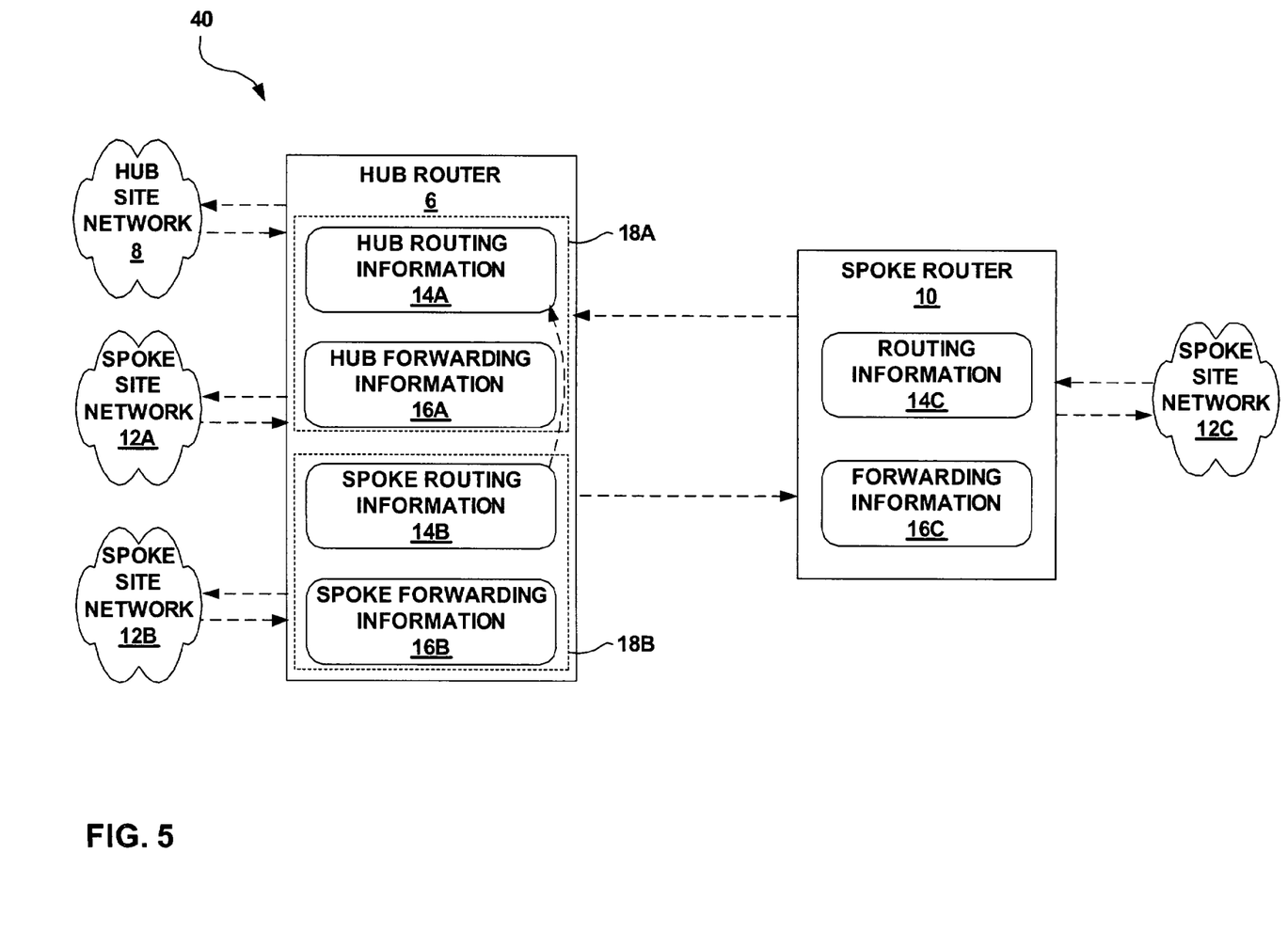
FIG. 5 is a block diagram illustrating an example flow of routing information within the VPN of FIG. 4.

FIG. 5 is a block diagram illustrating an example flow of routing information within hub-and-spokes VPN 40. As shown in FIG. 5, spoke router 10 includes routing information 14C and forwarding information 16C. As shown in FIG. 5, hub router 6 includes hub routing information 14A and spoke routing information 14B. Hub router 6 also includes spoke routing information 14B and spoke forwarding information 16B.

As described above with reference to FIG. 2, hub router 6 may be configured to include two routing instances, a hub routing instance 18A and spoke routing instance 18B ("routing instances 18"). Hub routing instance 18A may be associated with hub routing information 14A, hub forwarding information 16A, and a first access link 11 connecting hub router 6 to a gateway device within hub site network 8. Spoke routing instance 18B may be associated with spoke routing information 14B, spoke forwarding information 16B, and a second access link 11 connecting hub router 6 to the gateway device within hub site network 8. Spoke routing instance 18B of hub router 6 may also be associated with access links 11 that connect gateway devices within spoke site networks 12A-B to hub router 6. In general, hub router 6 is configured with two routing instances 18 to assure that hub router 6 forwards packets received from spoke site networks 12A-B and spoke router 10 using routes that traverse hub site network 8, as described above.

Hub routing instance 18A receives routes advertised by spoke router 10, e.g., local routes received by spoke router 10 from a connected gateway device within spoke site network 12C, and updates routing information 14A to include those routes. Hub routing instance 18A generates forwarding information 16A to include those routes, i.e., to indicate that packets received from hub site network 8 addressed to the destination device indicated in the routes are to be forwarded to spoke router 10. Hub routing instance 18A may advertise these routes to the connected gateway device within hub site network 8 with an indication that hub routing instance 18A is the next hop for the routes. As a result, the connected gateway device within hub site network 8 may advertise these routes to spoke routing instance 18B via the second access link 11 with an indication that the connected gateway device within hub site network 8 is the next hop for each of the routes. Spoke routing instance 18B may update spoke routing information 14B to include these routes, and may generate spoke forwarding information 16B to include the routes, i.e., to indicate that packets received from spoke site networks 12A-B addressed to the destination devices within spoke site network 12C indicated by the routes are to be forwarded to hub site network 8. Spoke routing instance 18B may advertise these routes received from the connected gateway device within hub site network 8 to connected gateway devices within spoke site networks 12A-B with an indication that spoke routing instance 18B is the next hop on the routes via the access links 11 associated with spoke routing instance 18B.

Thus, packets sent from a device within a spoke site network 12A or 12B and destined for a device within spoke site network 12C will be forwarded from a connected gateway device within the spoke site network 12A or 12B to spoke routing instance 18B via the access links 11 associated with spoke routing instance 18B. Spoke routing instance 18B will forward the packets to the connected gateway device within hub site network 8. The connected gateway device within hub site network 8 will forward the packets to hub routing instance 18A. Hub routing instance 18A will then forward the packets to spoke router 10. Spoke router 10 will then forward the packets to a connected gateway device within spoke site network 12C, which will forward the packets to the destination device. Thus, proper packet flow within VPN 40 for routes from spoke site networks 12A-B connected to hub router 6 to spoke site network 12C connected to spoke router 10 is achieved.

Spoke routing instance 18B may receive routes to destinations within spoke sites 12A-B advertised by connected gateway devices within spoke site networks 12A-B via the access links 11 associated with spoke routing instance 18B or configured by a user, and may update spoke routing information 14B to include these routes. These routes are local routes for hub router 6 that indicate that the connected gateway devices within spoke site networks 12A-B are the next hop for the route.

Because hub routing instance 18A is used to advertise routes for destinations within spoke site networks 12 to hub site network 8 in order to create routes that traverse hub site network 8 as described above, hub routing instance 18A may receive the local routes within spoke routing information 14B. Hub routing instance 18A may be configured to copy the local routes within spoke routing information 14B to hub routing information 14A. Hub routing instance 18A may generate forwarding information 16A to include these local routes and may use the local routes to forward packets received from hub site network 8 to connected gateway devices within spoke site networks 12A-B. Hub routing instance 18A may advertise these routes to the connected gateway device within hub site network 8 with an indication that hub routing instance 18A is the next hop for the routes. The connected gateway device within hub site network 8 may advertise these routes to spoke routing instance 18B via the second access link 11 with an indication that the connected gateway device within hub site network 8 is the next hop on the route. Spoke routing instance 18B may update routing information 14B to include these routes to destinations within spoke site networks 12A-B that traverse the hub site network 8. Spoke routing instance 18B may advertise these routes received from the connected gateway device within hub site network to connected gateway devices within spoke site networks 12A-B and to spoke router 10 with an indication that spoke routing instance 18B is the next hop on the routes.

Spoke routing information 14B will thus include the local routes to destinations within spoke site networks 12A-B received from connected gateway devices within spoke site networks 12A-B, and routes to the same destinations that traverse hub site network 8 received from the connected gateway device within hub site network 8. Spoke routing instance 18B may selectively generate forwarding information 16B to exclude the local routes. Spoke routing instance 18B receives packets from spoke router 10 and connected spoke site networks 12A-B and makes the initial decision as to how to forward the packet for hub router 6. If spoke routing instance 18B forwards the packets using the local routes, packets received from router 10 or a connected spoke site network 12A-B will be forwarded to another of connected spoke site networks 12A-B without having traversed the hub site network 8, leading to improper packet flow for a hub-and-spokes VPN 2. Spoke routing instance 18B may, as described above, identify local routes, and tag the local routes within spoke routing information 14B such that when spoke forwarding information 16B is generated, the local routes are not included.

Figure 6:
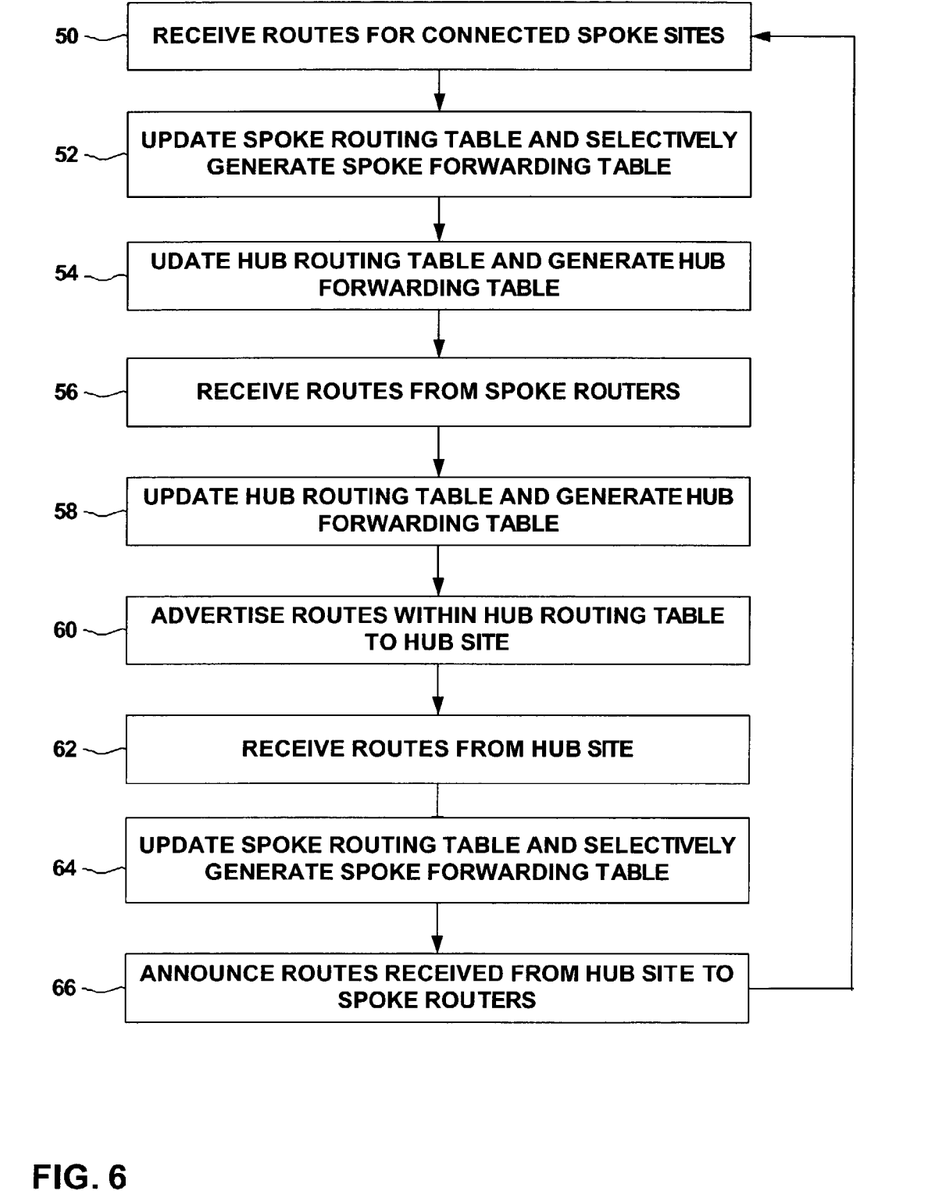
FIG. 6 is a flow diagram illustrating an example method that may be employed by a hub router to manage routing information.

FIG. 6 is a flow diagram illustrating an example method that may be employed by hub router 6 to manage routing information. Hub router 6 may receive routes for destinations within spoke site networks 12A-B from connected spoke sites 12A-B, as described above (50). Spoke routing instance 18B of hub router 6 may receive these local routes from connected gateway devices within hub site networks 12A-B via associated access links 11, or as configured by a user via a programming interface. Spoke routing instance 18B may update spoke routing information 14B to include these local routes, and selectively generate spoke forwarding information 16B to exclude these routes (52). Spoke routing instance 18B may identify local routes based on the interface or access link by which the routes were received, or based on user input. Spoke routing instance 18B may tag the local routes within spoke routing information 14B, and may selectively generate spoke forwarding information 16B by generating spoke forwarding information 16B to exclude tagged routes.

Hub router 6 may also update hub routing information 14A to include these local routes and generate hub forwarding information 16A to include these local routes (54). Hub routing instance 18A of hub router 6 may be configured to copy the local routes within spoke routing information 14B to hub routing information 14A. Hub router 6 via hub routing instance 18A may also receive routes for destination devices within non-connected spoke site networks 12 from spoke routers 10 (56). Hub routing instance 18A may update hub routing information 14A and generate forwarding information 14B to include the routes received from spoke routers 10 (58). These routes may be advertised by spoke routers 10 using the spoke tag, and the hub routing instance may have an import target of spoke, as described above.

Hub routing instance 18A of hub router 6 may advertise the received local routes and spoke routes to a connected gateway device within hub site network 8 (60). Spoke routing instance 18B of hub router 6 may receive routes to the destination within spoke site networks 12 that traverse hub site network 8 from the connected gateway device within hub site network 8 (62). Spoke routing instance 18B may update spoke routing information 14B to include these routes and selectively generate forwarding information 16B to include these non-local routes (64). Spoke routing instance 18B may advertise the routes received from hub site network 8 to connected gateway devices within spoke site networks 12A-B and spoke router 10 (66).

Various embodiments of the invention have been described. These and other embodiments are within the scope of the following claims.

The invention claimed is:

1. A method of controlling routing of data within a hub-and-spokes virtual private network (VPN) that comprises a hub and a plurality of spokes, wherein the hub comprises a hub provider edge (PE) routing device and each of the plurality of spokes comprises a respective one of a plurality of spoke PE routing devices, and wherein a first one of the plurality of spoke PE routing devices for a first one of the plurality of spokes is connected to at least two different spoke customer site networks located within the same first one of the plurality of spokes, the method comprising:

storing routes associated with either of the at least two different customer site networks of the first spoke within a single forwarding information data structure of the first spoke PE routing device for the same first spoke;

receiving, with the first spoke PE routing device for the first spoke, routes to destinations within the at least two customer site networks of the first spoke from a plurality of customer edge (CE) routing devices;

determining, with the first spoke PE routing device for the first spoke, that the routes are local routes when: (i) the routes are between the at least two different customer site networks of the first spoke, and (ii) only traverse the first spoke, wherein the determination that the routes are local is based on at least one of access links, routing protocols, or interfaces by which the routes were received; and selectively generating, with the first spoke PE routing device for the first spoke, forwarding information within the single forwarding information data structure for the hub-and-spokes VPN to exclude the local routes.

2. The method of claim 1, wherein the selectively generating forwarding information to exclude the local routes comprises:

tagging the local routes within routing information in the first spoke PE routing device for the first spoke; and generating the forwarding information to exclude the tagged routes.

3. The method of claim 1, further comprising updating, with the first spoke PE routing device for the first spoke, routing information to include the local routes.

4. The method of claim 1, further comprising forwarding packets from the first spoke PE routing device for the first spoke according to the routes within the forwarding information.

5. The method of claim 4, wherein receiving routes comprises receiving, with the first spoke PE routing device for the first spoke, routes from the hub PE routing device of the hub, wherein the forwarding information generated with the first spoke PE routing device for the first spoke includes routes received from the hub PE routing device, and wherein forwarding packets from the first spoke PE routing device for the first spoke comprises forwarding packets to the hub PE routing device based on the routes received from the hub PE routing device.

6. The method of claim 4, wherein receiving routes comprises receiving, with the first spoke PE routing device for the first spoke, routes from a hub site network within the hub, wherein the forwarding information generated with the first spoke PE routing device for the first spoke includes routes received from the hub site network, and wherein forwarding packets from the first spoke PE routing device for the first spoke comprises forwarding packets to the hub site network based on the routes received from the hub site network.

7. The method of claim 1, wherein receiving routes to destinations within the at least two different customer site networks from the plurality of CE routing devices comprises receiving the routes at the first spoke PE routing device for the first spoke via access links, the method further comprising:

associating a respective one of a plurality of labels with each of the access links;

for each of the local routes, associating, by the first spoke PE routing device for the first spoke, the local route with the label associated with that access link by which the local route was received;

advertising the local routes and the labels associated with the local routes from the first spoke PE routing device for the first spoke to the hub PE routing device of the hub-and-spokes VPN;

receiving packets that include the advertised labels at the first spoke PE routing device for the first spoke from the hub PE routing device; and selecting, with the first spoke PE routing device for the first spoke, on which of the access links to forward the packets based on the labels.

8. The method of claim 7, further comprising storing the associations between labels and access links in the single forwarding information data structure for the hub-and-spokes VPN maintained by the first spoke PE routing device for the first spoke.

9. The method of claim 7, wherein the labels are label switched labels, and wherein receiving packets comprising receiving packets via label switched paths.

10. The method of claim 1, wherein selectively generating forwarding information to exclude the local routes comprises selectively generating the forwarding information to exclude routes between the at least two different customer spoke site networks that do not traverse the hub.

11. A spoke provider edge (PE) routing device of a single one of a plurality of spokes of a hub-and-spokes virtual private network (VPN), the spoke PE routing device connected to each of a plurality of spoke customer site networks within the single spoke via a respective one of a plurality of customer edge (CE) routing devices, the spoke PE routing device comprising:

a plurality of interfaces; and a control unit to:

maintain a single forwarding information data structure for the hub-and-spokes VPN for the routes associated with the plurality of customer site networks within the single one of the spokes, receive routes to destinations within the plurality of spoke customer site networks from the plurality of CE routing devices via one or more of the interfaces, determine that the routes are local routes between the plurality of spoke customer site networks that traverse only the single one of the spokes based on at least one of access links, routing protocols, or the one or more interfaces by which the routes were received, and selectively generate forwarding information within the single forwarding information data structure for the hub-and-spokes VPN to exclude the local routes.

12. The routing device of claim 11, wherein the control unit selectively generates the forwarding information to exclude the local routes by tagging the local routes within routing information and generating the forwarding information to exclude tagged routes.

13. The routing device of claim 11, wherein the control unit updates routing information to include the local routes.

14. The routing device of claim 11, wherein the control unit receives packets via the interfaces, selects interfaces according to the routes within the forwarding information, and forwards packets on the selected interfaces.

15. The routing device of claim 14, wherein the control unit receives routes from a hub routing device of a hub of the hub-and-spokes VPN, selectively generates the forwarding information to include the routes received from the hub routing device, and forwards packets to the hub routing device based on the routes received from the hub routing device.

16. The routing device of claim 14, wherein the control unit receives routes from a hub site network within a hub of the hub-and-spokes VPN, selectively generates the forwarding information to include routes received from the hub site network, and forwards packets to the hub site network based on the routes received from the hub site network.

17. The routing device of claim 11, wherein the interfaces are coupled to the CE routing devices by respective access links, and wherein the control unit:
  associates a respective one of a plurality of labels with each of the access links,
  for each of the local routes, associates the local route with the label associated with the access link by which the local route was received,
  advertises the local routes and the labels associated with the local routes to a hub PE routing device within a hub of the hub-and-spokes VPN,
  receives packets that include the advertised labels from the hub PE routing device, and
  selects on which of the access links to forward the packets based on the labels.

18. The routing device of claim 17, wherein the control unit stores the associations between labels and access links in the single forwarding information data structure for the hub-and-spokes VPN.

19. The routing device of claim 11, wherein the control unit selectively generates the forwarding information to exclude routes between the plurality of customer spoke site networks that do not traverse a hub of the hub-and-spokes VPN.

20. A computer-readable medium comprising instructions that control routing of data within a hub-and-spokes virtual private network (VPN) having a hub and a plurality of spokes, wherein the hub comprises a hub provider edge (PE) routing device and each of the plurality of spokes comprises a respective one of a plurality of spoke PE routing devices, wherein one of the plurality of spoke PE routing devices is connected to each of a plurality of spoke customer site networks within a single one of the plurality of spokes by a respective one of a plurality of customer edge (CE) routing devices, wherein the instructions cause a processor of the spoke PE routing device to:
  maintain a single forwarding information data structure for the hub-and-spokes VPN for routes associated with the plurality of spoke customer site networks within the single one of the spokes;
  receive routes to destinations within the plurality of customer site networks from the plurality of CE routing devices;
  determine that the routes are local routes between the plurality of customer site networks that traverse only the single one of the spokes based on at least one of access links, interfaces, or routing protocols by which the routes were received; and
  selectively generates forwarding information within the single forwarding information data structure for the hub-and-spokes VPN to exclude the local routes.

21. The computer-readable medium of claim 20, further comprising instructions that cause the processor to forward packets according to routes within the forwarding information.

22. The computer-readable medium of claim 20, wherein local routes are received at the spoke PE routing device via access links, the medium further comprising instructions to cause the processor to:
  associate a respective one of a plurality of labels with each of the access links;
  for each of the local routes, associate the local route with the label associated with the access link by which that local route was received;
  advertise the local routes and the labels associated with the local routes from the spoke PE routing device to a hub PE routing device of the hub of the hub-and-spokes VPN;
  receive packets that include the advertised labels at the spoke PE routing device from the hub PE routing device; and
  select on which of the access links to forward the packets based on the labels.

23. The computer-readable medium of claim 20, wherein the instructions that cause a processor to selectively generate the forwarding information to exclude local routes comprise instructions that cause a processor to selectively generate the forwarding information to exclude routes between the plurality of customer spoke site networks that do not traverse the hub.

24. A method of controlling routing of data within a hub-and-spokes virtual private network (VPN) that comprises a hub and a plurality of spokes, wherein the hub comprises a hub provider edge (PE) routing device and each of the plurality of spokes comprises a respective one of a plurality of spoke PE routing devices, and wherein one of the plurality of spoke PE routing devices is connected to each of a plurality of spoke customer site networks within a single one of the spokes by a respective one of a plurality of customer edge (CE) routing devices, the method comprising:
  maintaining a single forwarding information data structure for the hub-and-spokes VPN within the spoke PE routing device for the routes associated with the plurality of customer site networks within the single one of the spokes;
  associating a respective one of a plurality of labels with each of a plurality of access links that connect the spoke PE routing device to the CE routing devices;
  receiving routes to destinations within the plurality of spoke customer site networks from the plurality of CE routing devices with the spoke PE routing device via the plurality of access links;
  determining, with the spoke PE routing device, that the routes are local routes between the plurality of spoke customer site networks that traverse only the single one of the spokes based on at least one of access links, routing protocols, or interfaces by which the routes were received;
  selectively generating, with the spoke PE routing device, forwarding information within the single forwarding information data structure for the hub-and-spokes VPN to exclude the local routes;
  for each of the local routes, associating, by the spoke PE routing device, the local route with the label associated with the access link by which the local route was received;
  advertising the local routes and the labels associated with the local routes from the spoke PE routing device to the hub PE routing device;
  receiving packets that include the advertised labels at the spoke PE routing device from the hub PE routing device; and
  selecting, with the spoke PE routing device, on which of the access links to forward the packets based on the labels.

25. The method of claim 24, wherein selectively generating forwarding information to exclude the local routes comprises selectively generating the forwarding information to exclude routes between the plurality of customer spoke site networks that do not traverse the hub.

26. A spoke provider edge (PE) routing device of a single one of a plurality of spokes of a hub-and-spokes virtual private network (VPN), the spoke PE routing device connected to each of a plurality of spoke customer site networks within the single one of the plurality of spokes of the hub-and-spokes VPN via a respective one of a plurality of customer edge (CE) routing devices, the spoke PE routing device comprising:

a plurality of interfaces; and
a control unit to:
  maintain a single forwarding information data structure for the hub-and-spokes VPN for the routes associated with the plurality of customer site networks within the single one of the spokes,
  associate a respective one of a plurality of labels with each of a plurality of access links that connect the spoke PE routing device to the CE routing devices,
  receive routes to destinations within the plurality of spoke customer site networks from the plurality of CE routing devices via the plurality of access links and one or more of the interfaces,
  determine that the routes are local routes between the plurality of spoke customer site networks that traverse only the single one of the spokes based on at least one of the access links, routing protocols, or the one or more interfaces by which the routes were received,
  selectively generate forwarding information within the single forwarding information data structure for the hub-and-spokes VPN to exclude the local routes,
  for each of the local routes, associate the local route with the label associated with the access link by which the local route was received,
  advertise the local routes and the labels associated with the local routes to a hub PE routing device of a hub of the hub-and-spokes VPN,
  receive packets that include the advertised labels from the hub PE routing device, and
  select on which of the access links to forward the packets based on the labels.

27. The routing device of claim 26, further comprising a network interface card, wherein the interfaces are physical or logical interfaces provided by the network interface card.

28. The routing device of claim 26, wherein the control unit selectively generates the forwarding information to exclude routes between the plurality of customer spoke site networks that do not traverse a hub of the hub-and-spokes VPN.

29. A computer-readable medium comprising instructions that control routing of data within a hub-and-spokes virtual private network (VPN) having a hub and a plurality of spokes, wherein the hub comprises a hub provider edge (PE) routing device and each of the plurality of spokes comprises a respective one of a plurality of spoke PE routing devices, wherein one of the plurality of spoke PE routing devices is connected to each of a plurality of spoke customer site networks within a single one of the plurality of spokes by a respective one of a plurality of customer edge (CE) routing devices, and wherein the instructions cause a processor of the spoke PE routing device to:
  maintain a single forwarding information data structure for the hub-and-spokes VPN for routes associated with the plurality of spoke customer site networks within the single one of the spokes;
  associate a respective one of a plurality of labels with each of a plurality of access links that connect the spoke PE routing device to the CE routing devices;
  receive routes to destinations within the plurality of customer site networks from the plurality of CE routing devices via the access links;
  determine that the routes are local routes between the plurality of customer spoke site networks that traverse only the single one of the spokes based on at least one of access links, interfaces, or routing protocols by which the routes were received;
  selectively generate forwarding information within the single forwarding information data structure for the hub-and-spokes VPN to exclude the local routes;
  for each of the local routes, associate the local route with the label associated with the access link by which the local route was received;
  advertise the local routes and the labels associated with the local routes to the hub PE routing device;
  receive packets that include the advertised labels from the hub PE routing device; and
  select on which of the access links to forward the packets based on the labels.

30. The computer-readable medium of claim 29, wherein the instructions that cause a processor to selectively generate the forwarding information to exclude local routes comprise instructions that cause a processor to selectively generate the forwarding information to exclude routes between the plurality of customer spoke site networks that do not traverse the hub.

31. A hub-and-spokes virtual private network (VPN) comprising:
  a hub that comprises a hub provider edge (PE) routing device connected to a hub customer site network; and
  a plurality of spokes, wherein each of the plurality spokes comprises a respective one of a plurality of spoke PE routing devices connected to at least one of a plurality of spoke customer site networks;
  wherein one of the plurality of spoke PE routing devices is connected to each of at least two of the spoke customer site networks within a single one of the spokes by a respective one of a plurality of customer edge (CE) routing devices, and the one of the plurality of spoke PE routing devices:
    maintains a single forwarding information data structure for the hub-and-spokes VPN for the routes associated with the plurality of customer site networks within the single one of the spokes;
    receives routes to destinations within the plurality of customer site networks from the plurality of CE routing devices;
    determines that the routes are local routes between the plurality of customer site networks that traverse only the single one of the spokes based on at least one of access links, interfaces, or routing protocols by which the routes were received; and
    selectively generates forwarding information within the single forwarding information data structure for the hub-and-spokes VPN to exclude the local routes.

32. The hub-and-spokes VPN of claim 31,
  wherein the spoke PE routing device receives the routes from the plurality of CE routing devices via access links that connect the spoke PE routing device to the plurality of CE routing devices, associates a respective one of a plurality of labels with each of the access links, for each of the local routes, associates the local route with the label associated with that access link by which the local route was received, and advertises the local routes and the labels associated with the local routes to the hub PE routing device,
  wherein the hub PE routing device selects which of the plurality of labels to attach to a packet based on a destination of the packet, and forwards the packet to the spoke PE routing device with the selected label attached to the packet, and
  wherein the spoke PE routing device selects on which of the access links to forward the packet based on the attached label.

* * * * *